United States Patent [19]

Bolinger et al.

[11] 4,111,003
[45] Sep. 5, 1978

[54] HYDRAULIC TRANSMISSION DRIVE ASSEMBLY WITH NOISE ATTENUATION MEANS

[75] Inventors: Jimmy W. Bolinger; Frederic W. Pollman, both of Ames; David N. Polaski, Nevada, all of Iowa

[73] Assignee: Sundstrand Corporation, Rockford, Ill.

[21] Appl. No.: 797,867

[22] Filed: May 17, 1977

[51] Int. Cl.² ............... F15B 15/18; F16H 39/46
[52] U.S. Cl. ...................... 60/469; 91/499; 180/70 R; 248/8; 417/363
[58] Field of Search ............ 60/403, 458, 469; 180/70 R; 248/8, 10; 417/363; 91/472, 499

[56] References Cited

U.S. PATENT DOCUMENTS

| | | | |
|---|---|---|---|
| 1,829,677 | 10/1931 | Royce | 248/9 |
| 1,881,777 | 10/1932 | MacPherson | 248/10 |
| 2,034,639 | 3/1936 | Saurer | 248/7 |
| 2,285,050 | 6/1942 | Pezzillo | 417/89 |
| 2,843,314 | 7/1958 | Hansen | 417/363 |
| 2,872,876 | 2/1959 | Thoma | 60/490 X |
| 2,928,961 | 3/1960 | Morrill | 310/91 |
| 2,936,591 | 5/1960 | Leipert | 74/606 R |
| 3,031,129 | 4/1962 | Gaudry | 417/363 |
| 3,161,388 | 12/1964 | Appleton | 248/2 |
| 3,810,519 | 5/1974 | Galos | 180/70 R |
| 3,902,567 | 9/1975 | Pekar | 180/70 R |
| 3,928,856 | 9/1975 | Hehl | 417/360 |
| 4,019,600 | 4/1977 | Master et al. | 180/70 R |

*Primary Examiner*—Edgar W. Geoghegan
*Attorney, Agent, or Firm*—Wegner, Stellman, McCord, Wiles & Wood

[57] ABSTRACT

A hydraulic transmission drive assembly having a pair of hydrostatic units mounted in a housing assembly for suspension from a primary housing and with the housing assembly supported on the primary housing by noise attenuation means including a pair of isolation mountings each of which are of a multi-layer construction with a plurality of plates for connection to either the primary housing or the housing assembly, with resilient material bonded therebetween and with mounting means extended through openings in said plates and surrounded by resilient material which is spaced from an opening in a center plate of the isolation mounting whereby axial loads result in compression of the resilient material and flexure of the plates and torsional and transverse loading results in shear of the resilient material under light loading and, under heavier loading, the resilient material surrounding the mounting means additionally acts in compression.

15 Claims, 3 Drawing Figures

U.S. Patent
Sept. 5, 1978
4,111,003
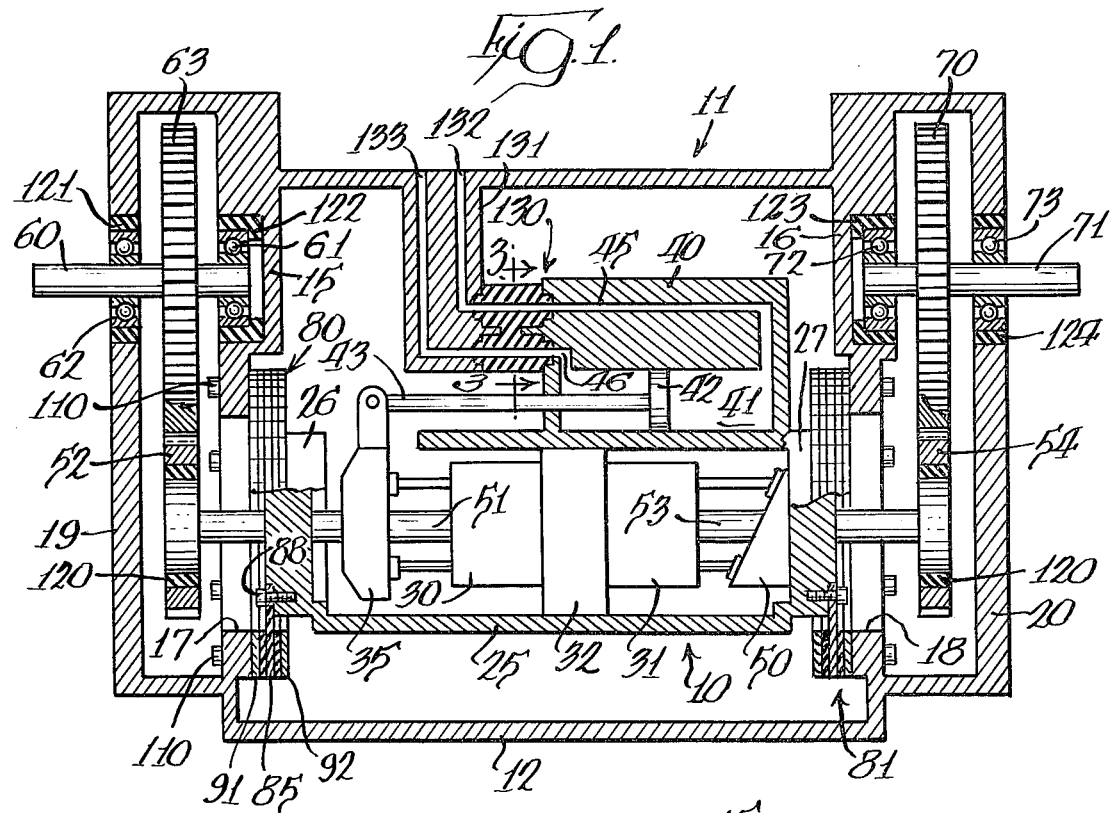
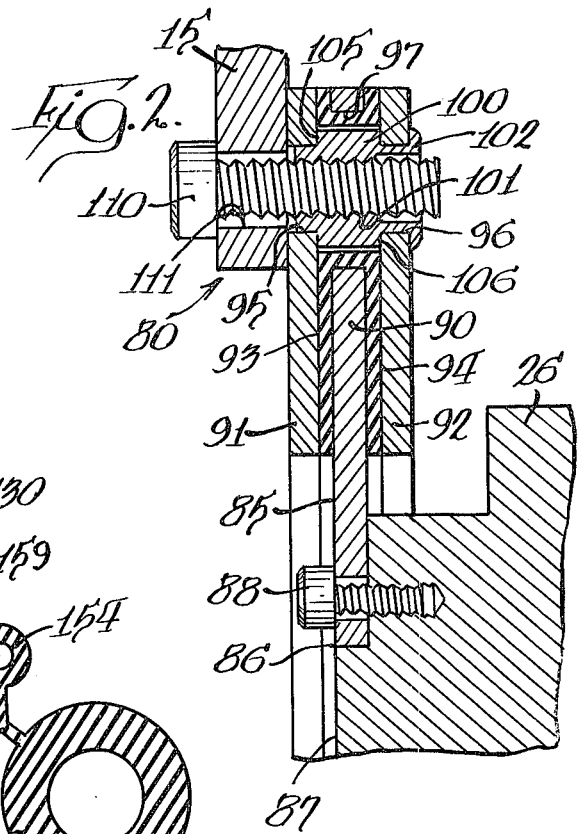
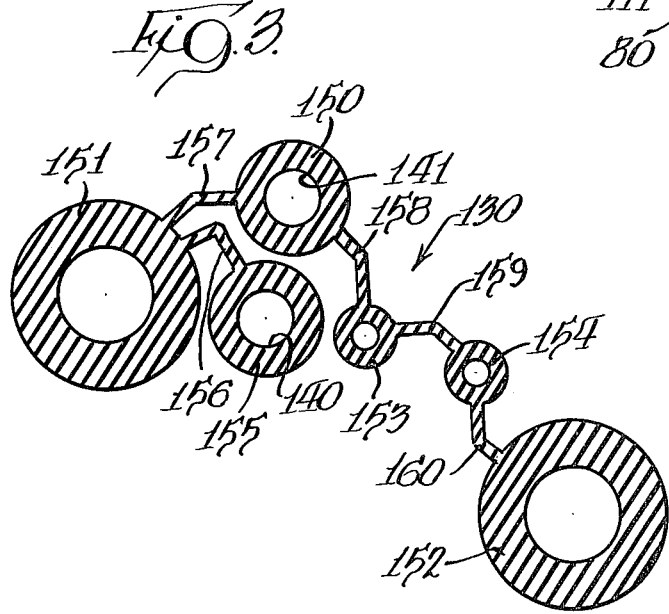

HYDRAULIC TRANSMISSION DRIVE ASSEMBLY WITH NOISE ATTENUATION MEANS

BACKGROUND OF THE INVENTION

Hydraulic units, such as fixed and variable displacement axial piston units used in hydrostatic or hydromechanical transmissions emit mechanical vibrations which are induced by rapid compression and decompression of fluid within the displacement units. Frequently, these vibrations are transmitted to the exterior housing components by way of rigid mechanical mountings, causing the housing to vibrate, thus radiating noise to its ambient environment. This radiated hydraulic noise is sometimes subjectively unacceptable and possibly illegal, prohibiting or restricting use of the hydraulics in some applications.

In operation of such units, for example when the units each have nine pistons, there is a changeover from four to five or five to four pistons at a relatively high frequency in each unit which thus results in a 20% force variation in each unit, with the rate of force change controlled by the configuration of a port plate interconnecting the displacement units. Additionally, the transmission is generating torque and a mounting to attenuate hydraulic noise must have the strength to properly support the housing assembly.

This invention pertains to structure to reduce the hydraulically-induced radiated noise by interrupting the vibration transmission path from the hydraulic units to an exterior housing. This is accomplished by assembling the hydraulic units and components associated therewith into a housing assembly and mounting this assembly to an exterior or primary housing by isolation mounting means, with this means being constructed to take up the torque.

The prior art includes Galos U.S. Pat. No. 3,810,519 and Pekar U.S. Pat. No. 3,902,567. The Galos patent shows a transmission drive assembly having a housing assembly mounted to a primary housing with elastomeric material or other suitable material disposed between the housing assembly and the primary housing. The Pekar patent shows a housing assembly for the transmission mounted to another housing by connections including elastomeric material. It is believed that these patents do not show a mounting of a housing assembly to a primary housing by structure which gives the new and improved results embodied in the structure disclosed in this application, including mountings which enable compression of resilient material and flexure of mounting plates to act in response to axially-induced forces and with the same mountings providing large areas of resilient material operable in shear to take up torque generated by the hydraulic units and transverse forces under relatively light loading and with the structure in effect providing a series spring rate by there additionally being compression of a part of the resilient material under heavier loading.

SUMMARY OF THE INVENTION

A primary feature of the invention disclosed herein provides the hydraulic transmission drive assembly with noise attenuating means constructed for improved action under torsional and transverse loading including provision for a series increasing spring rate resulting from shear deformation of resilient material under light loading followed by compressive loading as well as shear loading under heavier loads as well as compressive action under axial loading.

In carrying out the foregoing, an object of the invention is to mount a housing assembly carrying the hydraulic units and associated structure to a primary housing by isolation means to avoid transmission of noise wherein the isolation means includes a multi-layer mounting structure with center and side plates mounted one to the housing assembly and the other to the primary housing and with resilient material bonded therebetween and which is operable in both shear and compression whereby axial forces from the hydraulic units cause compression of the resilient material as well as flexure of the plates and torsional or transverse motions of the housing assembly result in shear action of the resilient material under light loading and with both shear and compression of the resilient material under heavier loading.

Another object of the invention is to provide structure, as defined in the preceding paragraph, and having the plates provided with annular segments in facing, spaced-apart relation for positioning of the resilient material therebetween by bonding to said faces and with mounting members extended through aligned openings in said plates and surrounded by resilient material spaced from the opening in a center plate to define an air gap whereby torsional and transverse motion results in shear action of the resilient material under relatively light loading and under heavier loading the center plate closes said gap and engages the resilient material surrounding the mounting members to provide for compressive action in addition to the shear action. Additionally, said mounting members provide a fail-safe feature to assure support of the housing assembly, even if there is a failure in the resilient material.

Another object of the invention is to have the structure designed whereby the natural frequency of the isolation mounting and the housing assembly and structure carried thereby is less than the frequency of the hydraulically-induced vibrations and an integral member formed to make hydraulic connections is positioned between the primary housing and the housing assembly and with the flexure thereof being controlled so that the effective spring rate of the isolation mounts are unaffected by said connector structure. Additionally, further noise isolation may be achieved by use of resilient drive rings as part of the shaft and gear assemblies associated with the hydraulic units or by mounting the shaft and gear assemblies as well as associated gear and shaft structure in resilient isolator mounts.

BRIEF DESCRIPTION OF THE DRAWING

FIG. 1 is a longitudinal sectional view of a hydraulic transmission drive assembly having the noise attenuation means;

FIG. 2 is an enlarged sectional view showing a part of an isolation mounting and the connection thereof to the primary housing and housing assembly; and FIG. 3 is a sectional view, on an enlarged scale, taken generally along the line 3—3 in FIG. 1.

DESCRIPTION OF THE PREFERRED EMBODIMENT

The hydraulic transmission drive assembly, indicated generally at 10, is associated with a primary housing, indicated generally at 11. The primary housing has a central section with wall structure 12 defining a chamber to receive the drive assembly 10. Additionally, there are a pair of transverse walls 15 and 16 each having a generally cylindrical opening 17 and 18, respectively, and with end covers 19 and 20 spaced at a distance from the transverse walls 15 and 16.

The transmission drive assembly 10 includes a housing assembly having a generally cylindrical wall 25 and a pair of end walls 26 and 27 for mounting several structural elements of the transmission. These elements include a pair of hydraulic units 30 and 31 which preferably are axial piston units and which are interconnected by a port plate 32. The hydraulic unit 30 is a variable displacement type with the stroke of the axial pistons carried by a rotatable cylinder block being controlled by the angle of a movable swash plate 35 with this swash plate and the motion connections to the axial pistons of the hydraulic unit 30 being well known in the art. The angle of the swash plate 35 is controlled by displacement control servo means including a section 40 of the housing assembly extending to one side of the cylindrical wall 25 and having a part thereof defining a cylinder 41 in which a piston 42 is movable and which is connected to the swash plate by a motion-transmitting link 43. The housing section 40 has a pair of fluid passages 45 and 46 whereby fluid can be directed to the cylinder 41 for controlling the position of the piston 42 and, thus, the angle of the swash plate 35.

The displacement unit 31 is shown as a fixed displacement unit and in normal operation would function as a motor with the displacement unit 30 functioning as a pump. The fixed displacement unit 31 has the stroke of its axially movable pistons which are carried in a rotatable cylinder block controlled by a swash plate 50 at a fixed angle, again in the manner well known in the art.

Each of the hydraulic units has a shaft and gear assembly associated therewith, with the variable displacement unit 30 having a drive shaft 51 extending through an opening in the end wall 26 of the housing assembly and mounted therein by suitable bearing means (not shown) and beyond the transverse wall 15 of the primary housing having a gear 52. The shaft and gear assembly associated with the fixed displacement unit 31 includes a shaft 53 extending through the end wall 27 of the housing assembly and rotatably mounted therein by bearings (not shown) and which extends beyond the transverse wall 16 of the primary housing and has a gear 54 mounted thereon. The particular arrangement of shaft and gear assemblies shown herein is for illustrative purposes, with there being other possible arrangements of such assemblies.

The variable displacement unit 30 in normal operation is driven from a drive shaft 60 mounted in the primary housing by bearing means 61 and 62 in the transverse wall 15 and end cover 19, respectively, and with this shaft carrying a gear 63 which meshes with the gear 52. Rotation of the shaft 60 acts through the meshing gears 52 and 63 to drive the shaft 51 for rotating the cylinder block of the hydraulic unit 30.

Output from the fixed displacement unit 31 results in rotation of the shaft 53 and gear 54 to rotate a gear 70 carried on an output shaft 71 which is rotatably mounted by bearings 72 and 73 in the transverse wall 16 and the end cover 20 of the primary housing.

In operation of the transmission and assuming that the hydraulic units 30 and 31 each has nine pistons there are transitions between 4 and 5 pistons being pressurized or non-presurized in each revolution of the cylinder blocks of the units. This is occurring at a relatively high frequency and means a 20% force variation in each unit, with this rate of force change controlled by the configuration of the flow paths in the port plate 32. This can result in mechanical vibration and radiated hydraulic noise unless the vibrations are isolated from the primary housing. This is accomplished by the use of isolation mountings for mounting the housing assembly 10 to the primary housing 11, with there being two of these mountings, indicated generally at 80 and 81 in FIG. 1 and with a part of the mounting 80 being illustratively shown in section in FIG. 2. The isolation mounting includes a flat plate 85 having a central opening 86 to receive a cylindrical end section 87 of the end wall 26 of the housing assembly and with these parts being secured together by an annular array of fastening members 88. The center plate 85 has a generally annular segment 90 extending beyond the housing assembly and which is positioned between a pair of annular side plates 91 and 92 with the side plates being spaced from the center plate 90, in order to permit bonding of a resilient material, such as an elastomeric material, to the opposing faces of the plates to provide two resilient intermediate layers 93 and 94.

Each of the side plates 91 and 92 has an opening as identified at 95 and 96, respectively, which is coaxial with a large opening 97 in the center plate 85.

These openings provide for positioning of mounting structure therein including a tubular spacer ring 100 having a threaded interior 101 and having an end extending through the side plate opening 96 and swaged and staked thereto, as shown at 102, and with another part extended through the opening 95 of the side plate 91. The spacer ring has a central section of a larger diameter to provide a pair of shoulders 105 and 106 which control the spacing between the side plates when the isolation mounting is secured to a transverse wall of the primary housing by means, such as an annular array of threaded bolts 110 which pass through an opening 111 in the transverse wall 15 and thread into the threaded interior 101 of the spacer rings.

The resilient material is also positioned in surrounding relation to the enlarged central section of the spacer ring 100 and is spaced therefrom, as shown in FIG. 2, to form an air gap.

The forces acting axially of the hydraulic units, i.e., in the direction of the length of the shafts 51 and 53, are absorbed by the isolation mounts by compression of a layer of resilient material between a center plate 90 and an adjacent side plate and, additionally, by flexure of said plates. The compression spring rate is determined by the surface area common to the plates and resilient material, the thickness of the material and the composition thereof.

Forces created resulting in transverse motion of the housing assembly as well as take-up of the torque are absorbed by shearing action of the resilient material disposed between the plates of the isolation mounting and, specifically, under relatively light loading. The shearing action results in a shear spring rate which is independent of deformation of the resilient material. Under heavier loading, the shift of the center plate 85 relative to the side plates 91 and 92 is sufficient to cause shifting of the opening 97 in the center plate in a direction to close the air gap surrounding the enlarged central section of the tubular spacer ring 100 and put the resilient material disposed therearound in compression to give a series effect on the spring rate with an increased spring rate resulting from the compression action in addition to the shear action. This is a multiple spring rate capability which insures maintaining the desired spring rate at low loading, but prevents excessive movement at the gear meshes during high loading.

The structure last described also provides a fail-safe feature whereby if the resilient material should fail, the center plate 85 is captured on the spacer ring 100 to continue the support of the housing assembly. Wear of the spacer ring 100 could ultimately result in support by the bolt 110.

The foregoing structure attenuates noise by having the features described and with the natural frequency of the isolation mountings 80 and 81, and the housing assembly and associated components substantially less than the frequency of the hydraulically-induced vibrations.

Additional features of the noise attenuation means includes the use of a resilient drive ring 120 in the shape of an annular member forming part of the gears 52 and 54 which provide for transverse and torsional deformation in these gears to effect an isolation between the hydraulic transmission disturbances and the input shaft 60 and output shaft 71. An alternate method for improving hydraulic noise attenuation in place of the resilient drive rings 120 by the reduction of gear-induced noise is to mount the bearings for the input shaft 60 and the output shaft 71 in resilient isolator mounts 121, 122, 123, and 124, respectively (FIG. 1).

Hydraulic fluid is transferred between the housing assembly components and the main external lines by use of a hydraulic transfer connector of molded elastomeric material, indicated generally at 130 and shown particularly in FIGS. 1 and 3, which connects a plurality of fluid passages in the housing section 40 with a plurality of fluid passages in a section 131 of the primary housing. As illustrated, the housing section 131 has a pair of fluid passages 132 and 133 communicating with the fluid passages 45 and 46 through a pair of fluid passages 140 and 141 in the connector member 130. The connector member 130 has a series of tubular sections 150, 151, 152, 153, 154, and 155 each having a fluid passage therethrough and with the tubular members 150 and 155 providing the fluid passages 140 and 141. These two flow passages are shown in FIG. 1, with the other fluid passages connecting to the integral transfer connector not being shown in FIG. 1, but with the total of six flow passages in the transfer connector 130 providing for two charge lines, two flow passages for the displacement servo for the variable displacement unit, and two passages for signalling as to swash plate position. These tubular sections are integrally and flexibly interconnected by a series of ribs 156–160, with flexural, tensile, and compressive stiffnesses thereof selected so that the connector member will have negligible effect on the sound isolation provided by the isolation mounts 80 and 81. Each of the tubular members 150–155 has a reduced end section to provide for insertability thereof within the ends of the flow passages in the primary housing section 131 and the housing section 40 of the housing assembly, and as shown particularly in FIG. 1.

We claim:

1. A hydrostatic transmission drive assembly with reduced noise transmission including a primary housing, a housing assembly mounting a pair of hydraulic units with an interconnecting port plate, each of said units having a shaft and gear assembly associated therewith and at least one unit having displacement control means, and isolation mounting means operable in shear and compression for connecting said housing assembly to said primary housing, including a multi-layer unit with layers of resilient material operable in compression with respect to forces axially of said units and operable successively in shear for light torsional loads and in both shear and compression for heavier torsional loads.

2. A hydrostatic transmission drive assembly as defined in claim 1 wherein said isolation mounting means and the housing assembly carried thereby have a natural frequency less than the vibrations induced by said hydraulic units, and flexible connector means in the form of an integral member with plural flow passages and having properties to have negligible effect on the action of said isolation mounting means for hydraulically connecting said housing assembly to the primary housing.

3. A hydrostatic transmission drive assembly as defined in claim 1 wherein each of said isolation mounting means includes interengaging planar members bonded together with at least one being of elastomeric material, said planar members providing a large area to act in shear and take up torque from operation of the hydraulic units.

4. A hydrostatic transmission drive assembly as defined in claim 1 wherein each of said shaft and gear assemblies includes a gear surrounding a shaft, and a resilient member therebetween to permit transverse and torsional deformation of the gear and shaft relative to each other.

5. A hydrostatic transmission drive assembly as defined in claim 1 including drive gearing mounted in said primary housing and connected to said shaft and gear assemblies, and means defining isolator mounts for mounting said drive gearing to said primary housing.

6. A hydrostatic transmission drive assembly as defined in claim 1 including flexible hydraulic connector means in the form of an integral member of elastomeric material having plural fluid passages extended therethrough and each defined by a generally tubular part of said member, and relatively thin ribs interconnecting said tubular parts.

7. A hydrostatic transmission drive assembly as defined in claim 6 wherein said housing assembly has a plurality of fluid passages aligned with fluid passages in said primary housing and interconnected by tubular parts of said integral member.

8. A hydrostatic transmission drive assembly as defined in claim 7 wherein the adjacent ends of the fluid passages of the housing assembly and the primary housing are of a size to receive the opposite ends of said tubular parts therein.

9. A hydrostatic transmission drive assembly as defined in claim 1 wherein said isolation means includes a center plate affixed to said housing assembly and of a size to have a generally annular segment of the plate exposed beyond said housing assembly, a pair of spaced-apart generally annular side plates positioned one to each side of the center plate, and resilient material bonded between said center plate and each of said side plates.

10. A hydrostatic transmission drive assembly as defined in claim 9 including a mounting bolt extended through said side plates for mounting thereof to said primary housing, a tubular spacer surrounding said mounting bolt and extended through said side plates, said spacer being fastened to one side plate and having a pair of opposed shoulders engageable one with each side plate to limit movement of the side plates toward each other when the mounting bolt is tightened.

11. A hydrostatic transmission drive assembly as defined in claim 10 wherein resilient material surrounds said tubular spacer and is initially located at a distance from said spacer whereby said center plate after a predetermined movement relative to said side plates will compressively engage said surrounding resilient material against said tubular spacer.

12. A hydrostatic transmission drive assembly mountable in a primary housing and with means associated therewith for attenuating hydraulic noise comprising, a housing assembly having a pair of hydrostatic units with at least one being of variable displacement and with an interconnecting port plate, each of said hydrostatic units having a shaft and gear assembly, said noise attenuating means including means for mounting said housing assembly to said primary housing and having two center plates affixed to said housing assembly and each having a generally annular segment extending beyond the housing assembly, two pairs of generally annular spaced-apart side plates fastened to the primary housing with each pair of side plates receiving the annular segment of a center plate therebetween, and resilient material bonded between said center plate and side plates.

13. A hydrostatic transmission drive assembly as defined in claim 12 wherein said side and center plates have aligned openings, means extended through said openings to mount the side plates, said openings in the center plates being enlarged to be at a distance from the mounting means, and resilient material surrounding said mounting means and spaced therefrom to define an air gap therebetween.

14. A hydraulic transmission drive assembly mountable in a primary housing and with means associated therewith for attenuating hydraulic noise comprising, a housing assembly having a pair of hydraulic units which create axial and torsional loads and vibration, said noise attenuating means including means for mounting said housing assembly to said primary housing and having a center plate and a pair of spaced-apart side plates with the side plates receiving a center plate therebetween, resilient material bonded between said center plate and side plates, said side and center plates have aligned openings, means extended through said openings to mount the side plates to one of said primary housing or housing assembly, said opening in the center plate enlarged to be at a distance from the mounting means, and resilient material surrounding said mounting means and spaced therefrom to define an air gap therebetween.

15. A hydraulic transmission drive assembly as defined in claim 14 wherein said mounting means includes a bolt and a surrounding spacer ring which provide a drive interlock with said plates in the event of failure of said resilient material.

* * * * *